3,199,971
METHOD OF ACCELERATING PLANT GROWTH
Gisen Shimazaki, 76 2-chome Tanabehigashino-cho,
Higashisumiyoshi-ku, Osaka, Japan
No Drawing. Filed Mar. 1, 1963, Ser. No. 262,209
Claims priority, application Japan, Mar. 17, 1962,
37/10,769
6 Claims. (Cl. 71—2.3)

This invention relates to novel plant growth accelerating compositions. More particularly, the present invention relates to plant growth accelerating compositions characterized by containing one or more nitro-derivatives of phenol, guaiacol and xylenol and their water soluble salts.

This invention is based on the findings that nitrophenol, nitro-guaiacol, nitro-xylenol or salts thereof are remarkably active in promoting the plasma movement of a plant so that the metabolic rate of the plant is accelerated with the result that the plant growh is remarkably accelerated.

In using these nitro-compounds as plant accelerating compositions they may be dissolved or dispersed in a suitable liquid carrier such as water or an organic solvent such as methanol, ethanol, etc. Alternatively, the composition may be in the form of solid, e.g. powder, and may contain, in addition to one or more of the nitro-compounds or their water soluble salts, a suitable powdery carrier, agricultural chemicals, plant hormones and/or manures. Examples of powdery carriers are clay, talc, diatomaceous earth, starch, magnesium sulfate, calcium carbonate, potassium sulfate, potassium carbonate, Glauber's salt, lactose, etc. The proportions of the nitro compounds or their water soluble salts (e.g. sodium salts, potassium salts, calcium salts, etc.) and/or other additives are not critical and may vary over a wide range depending upon the particular use and upon how it is diluted in actual use.

The compositions of this invention may be applied to plants in the conventional manner. Thus, for example, the composition can be diluted wth a suitable quantity of water to a desired concentration. Seeds or the like (such as bulbs, tubers, etc.) may be immersed in the solution prior to seeding or planting. Alternatively the diluted solution, dispersion or powdery composition may be applied to the plant, e.g. by spraying.

As mentioned above, the amount of the active ingredient(s) (the mono-nitro compounds or their salts) in the composition is not critical. However, generally, when the composition is employed with 1,000 times dilution, the active ingredient(s) may be about 0.05 to 40.0 parts (preferably 1.0 to 10.0 parts) in 100 parts by weight of the composition.

Mono-nitro derivatives of phenol, guaiacol and xylenol, and their water soluble salts which are used in the compositions of this invention may be prepared in any conventional manner well known in the art of nitration of organic compounds. Thus, for example, phenol, guaiacol or xylenol are nitrated with a nitrating agent such as nitric acid. The nitration may be conducted by reacting the particular starting compound (phenol, guaiacol or xylenol) with concentrated nitric acid (e.g. fuming nitric acid) or nitre in the presence or absence of concentrated sulfuric acid. The amount of nitrating agent used may be the chemically equivalent amount or, preferably, a slight excess may be used with respect to the particular starting compound. The temperature and reaction time may vary over a wide range depending upon each other and also on the volume or the components of the reaction mixture and the operating conditions such as efficiency of stirring. Generally, the nitration reaction is completed within about 2 or 3 hours at a temperature between 20 and 90° C.

After the nitration, the reaction mixture is neutralized and may be diluted with water. The resulting solution as such may be used as a composition of this invention. Alternatively, the said reaction mixture is neutralized and the liquid is evaporated to dryness. The solid residue is crushed to powder, which is then mixed with suitable carrier(s) and/or additive(s). Thus, it is not always necessary to purify the reaction product. The crude reaction product may be employed in formulating a composition of this invention.

If desired, the mono-nitro compounds may be isolated from the reaction product mixture. This can be carried out by distillation, solvent extraction or a combination thereof. Before or after the isolation, it is preferable to convert the nitro-compounds into their water soluble salts. Then, the isolated mono-nitro compound may be mixed with a liquid or powdery carrier and/or desired additive(s) exemplified hereinbefore.

This invention will be described in further detail by reference to the following examples which are given only by way of illustration and not to limit the invention.

EXAMPLE 1

Equal amounts of phenol and concentrated nitric acid (sp. gr. 1.38) are heated at a temperature ranging from 70° C. to 80° C. for 2 hours and the resulting oily product neutralized with caustic soda or soda ash, followed by evaporation to dryness. The dried product was then crushed, and one part of the resulting powder was thoroughly blended with 3 parts of potassium sulfate. This composition was useful as a plant growth accelerating agent.

EXAMPLE 2

The oily matter obtained by nitrating guaiacol with concentrated nitric acid (sp. gr. 1.41) was neutralized with sodium bicarbonate, followed by evaporation to dryness. The dried product was then crushed and 1 part of the resulting powder was blended with 3 parts of potassium carbonate to prepare a plant accelerating composition.

EXAMPLE 3

The product obtained by reacting xylenol with concentrated nitric acid (sp. gr. 1.41) in a volume proportion of 10:8 at a temperature ranging from 40° to 50° C. for 2 hours was neutralized with sodium bicorbonate or caustic soda. One part of this product was thoroughly blended with 3 parts of magnesium sulfate to obtain a plant growth accelerating composition.

EXAMPLE 4

Equal amounts of phenol and concentrated nitric acid (sp. gr. 1.38) were reacted together at a temperature ranging from 70 to 80° C. for 2 hours, and the resulting oily matter was neutralized with sodium bicarbonate, followed by evaporation to dryness. The dried product was then crushed. The resulting powder was designated as product A.

On the other hand, the product obtained by reacting guaiacol with nitric acid (sp. gr. 1.41) in a volume proportion of 10:8 at a temperature ranging from 70 to 80° C. for 2 hours was neutralized with soda ash, followed by evaporation to dryness. The resulting product was designated as product B. One part of the product A, 1 part of the product B, and 6 parts of talc were thoroughly blended, to obtain an effective plant growth accelerating composition.

EXAMPLE 5

Equal amounts of phenol and concentrated nitric acid (sp. gr. 1.38) were reacted together at a temperature ranging from 70 to 80° C. for 2 hours, and the resulting oily matter neutralized with caustic soda, followed by evaporation to dryness. The dried substance was crushed to obtain product C. On the other hand, the product obtained by reacting xylenol with concentrated nitric acid (sp. gr. (1.41) in a volume proportion of 10:20 at a temperature ranging from 70 to 80° C. for 2 hours was neutralized with sodium bicarbonate, followed by evaporation to dryness. The dried substance was then crushed to obtain product D. One part of the product C, 1 part of the product D, and 6 parts of clay were thoroughly blended, to obtain a plant growth accelerating composition.

EXAMPLE 6

The oily matter obtained by nitrating guaiacol with concentrated nitric acid (sp. gr. 1.41) was neutralized with caustic soda, followed by evaporation to dryness. The dried substance was crushed to obtain product E. On the other hand, the product obtained by reacting xylenol with concentrated nitric acid (sp. gr. 1.41) in a volume proportion of 10:8 at a temperature ranging from 70 to 80° C. for 2 hours was neutralized with sodium bicarbonate, followed by evaporation to dryness. The dried substance was then crushed to obtain product F.

One part of the product E, 1 part of the product F and 6 parts of calcium carbonate were thoroughly blended, to obtain a plant growth accelerating composition.

EXAMPLE 7

The product prepared by nitrating guaiacol with concentrated nitric acid (sp. gr. 1.41) was subjected to a steam distillation to remove unreacted guaiacol. The remaining mononitroguaiacol was neutralized with sodium bicarbonate or caustic soda to pH 7.0, followed by evaporation to dryness. The product was extracted with 85% alcohol to obtain sodium mononitroguaiacolate, and the alcoholic solution thus obtained was filtered and decolorized with active charcoal. Evaporating the alcohol yielded orange-yellow crystals of sodium mononitroguaiacolate, which were then dried at 60° C. The product was mixed with a liquid or powdery carrier.

EXAMPLE 8

124 grams of guaiacol was charged in a flask containing a stirrer and concentrated nitric acid (specific gravity: 1.38). 360 cc. of concentrated sulfuric acid (specific gravity: 1.85) was gradually added dropwise. The reaction was conducted at a temperature held between 25 and 50° C. by cooling the exterior surface of the flask, for 1 hour. After the reaction was completed, the product was washed with water to remove the excess acids. The product was then subjected to steam fractional distillation to collect 3-nitroguaiacol, and the residue was dissolved in hot water. The solution was then filtered and decolorized with active charcoal, followed by concentration of the filtrate to isolate 4-nitroguaiacol. Each of the mononitroguaiacols prepared above was finally treated with caustic soda to obtain sodium mononitroguaiacolate which was then mixed with a powdery carrier.

EXAMPLE 9

A mixture of 124 grams of guaiacol and 200 grams of nitre was gradually added to 300 grams of concentrated sulfuric acid while stirring. The reaction proceeded at 50 to 80° C. for 2 hours. Then water was added to the product to remove the unreacted guaiacol and the excess acid. The product was then fractionated to recover 3-nitroguaiacol and the residue was dissolved in water. The aqueous solution was decolorized with activated charcoal and filtered. The filtrate thus obtained was concentrated to isolate 4-nitroguaiacol. Each of the mononitroguaiacols obtained above was then treated with caustic soda to yield sodium mononitroguaiacolate, which was then mixed with a liquid or powdery carrier.

EXAMPLE 10

The product was prepared by reacting xylenol with concentrated nitric acid (sp. gr. 1.41) in a volume proportion of 10:8 at a temperature ranging from 60 to 70° C. for 2 hours. The product was then subjected to steam fractional distillation to remove the unreacted xylenol. The remaining mononitroxylenol was neutralized with sodium bicarbonate or caustic soda to pH 7.0, followed by evaporation to dryness. The mononitroxylenol was extracted with 85% alcohol, and the resulting alcoholic solution was decolorized with active charcoal and filtered, followed by evaporation. The orange-yellow crystals of mononitroxylenol thus obtained were dried at 60° C. This product was mixed with a powdery or liquid carrier.

EXAMPLE 11

106 grams of xylenol was charged in a flask containing an agitator and 200 cc. of concentrated nitric acid (specific gravity: 1.38) and 300 cc. of concentrated sulfuric acid was slowly added dropwise. The reaction proceeded at a temperature between 25 and 45° C. for 2 hours. After the reaction, the product was washed with water to remove excess acid. The product was then subjected to a fractional steam distillation to collect 3-nitroxylenol, and the residue was dissolved in hot water. The aqueous solution was decolorized with active charcoal and filtered, followed by concentration of the filtrate to obtain 4-nitroxylenol. Each of the nitroxylenols obtained above was then treated with caustic soda to obtain sodium mononitroxylenolate, which was then mixed with a liquid or powdery carrier.

EXAMPLE 12

A mixture of 106 grams of xylenol and 205 grams of nitre was gradually added to 310 grams of concentrated sulfuric acid while stirring. The reaction was carried out for 2 hours at a temperature of 30 to 50° C. After the reaction, the product was washed with water to remove excess acid. The product was then subjected to a fractional steam distillation to collect 3-nitroxylenol, and the residue was dissolved in hot water. The aqueous solution was decolorized with active charcoal and filtered, then the filtrate was concentrated to isolate 4-nitroxylenol. Each of the nitroxylenols prepared above were treated with caustic soda to obtain sodium mononitroxylenolate, which was mixed with a powdery or liquid carrier.

In a manner similar to that described in Examples 7 to 12, sodium salt of mononitroguaiacol or sodium salt of mononitroxylenol was obtained. The sodium salt of mononitroguaiacol or mononitroxylenol manufactured in the manner described above will hereinafter be referred to as product G.

EXAMPLE 13

The oily matter obtained by reacting equal amounts of phenol and concentrated nitric acid (sp. gr. 1.38) at a temperature between 60 and 70° C. for 1 hour was distilled to remove unreacted phenol. The remaining mononitrophenol was neutralized with sodium bicarbonate or caustic soda to pH 7.0, followed by evaporation to dryness. The dried product was extracted with 85% alcohol to obtain sodium salt of mononitrophenol, and the resultant alcoholic solution was decolorized with active carbon and filtered. As the alcoholic solvent was evaporated, orange-yellow crystals of the sodium salt of mononitrophenol was obtained. This sodium salt was dried at 60° C. and then mixed with a liquid or powdery carrier.

EXAMPLE 14

A mixture of 275 cc. of nitric acid (specific gravity: 1.11) and 350 cc. of concentrated sulfuric acid (specific gravity: 1.85) was charged in a flask furnished with a stirrer. Then, 50 grams of phenol was gradually added thereto while stirring and the reaction was conducted for 1 hour at a temperature of 25 to 40° C. by cooling the exterior of the flask with water. Then, the product was washed with water to remove excess acids, followed by fractional steam distillation to separate orthonitrophenol, which was then treated with caustic soda to obtain sodium salt of orthonitrophenol. The distillation residue was dissolved in hot water, and the resulting solution was filtered through active charcoal layer. The filtrate was concentrated to obtain paranitrophenol, which was then treated with caustic soda to obtain sodium salt of paranitrophenol. This compound was then mixed with a powdery or liquid carrier.

EXAMPLE 15

A mixture of 50 grams of phenol and 10 grams of nitre was gradually added to 150 grams of concentrated sulfuric acid. The reaction was carried out for 2 hours at a temperature of 40 to 70° C. After the reaction, the product was washed with water to remove excess acid. The reaction product was then fractionated to separate orthonitrophenol, and the residue dissolved in hot water. The solution was decolorized with active charcoal and filtered. Concentrating the filtrate there was obtained paranitrophenol. The nitrophenol prepared above was treated with caustic soda to obtain sodium salts ortho- and para-nitrophenol.

The sodium salts of mononitrophenol obtained in any of Examples 13 to 15 will hereinafter be referred to as product H.

A mixture of 1000 grams of bentonite, 4 grams of vitamin $B_1$, 5 grams of sodium glutamate, 6 grams of product G and 6 grams of product H was crushed and thoroughly blended to prepare a final product.

The effect of the compositions of this invention will be apparent from the following test data.

(A) *Rice*

(1) Materials: One part of the composition of Example 1 was diluted with 3000 parts of water.
(2) Species: Rice—Tomoe masari.
(3) Sowing: March 25. The rice seeds were sowed after having been soaked in the above mentioned solution for 12 hours.
(4) Transplanting: May 2.
(5) Data of the observation on May 2.

| Items | Average number of roots | Average length of root, cm. | Average length of leaf, cm. | Average numbes of leaver |
|---|---|---|---|---|
| (1) Non-treated | 11.9 | 11.5 | 14.2 | 4.0 |
| (2) Treated | 12.1 | 12.7 | 15.7 | 4.0 |

| | Dry weight | | |
|---|---|---|---|
| | Under ground | Surface | |
| (1) | 0.278 gr | 0.58 gr | }19 bodies were picked on examination. |
| (2) | 0.290 gr | 0.81 gr | |

(6) Results:

| Items | Length of straw, cm. | Length of ear, cm. | Average weight of ears, gr. |
|---|---|---|---|
| (1) Non-treated | 49.8 | 13.9 | 0.89 |
| (2) Treated by soaking the seeds in the solution | 54.5 | 13.9 | 1.11 |
| (3) Treated by sprinkling the solution over the seed bed | 61.4 | 14.3 | 1.12 |
| (4) Treated by sprinkling over the seed bed and spraying over primary ears | 63.8 | 15.2 | 1.20 |

| | Average number of mature grains per one ear | Average number of inmature grains per one ear | Average number of the entire grains per one ear |
|---|---|---|---|
| (1) | 44.6 | 2.5 | 47.1 |
| (2) | 49.6 | 2.6 | 51.6 |
| (3) | 52.1 | 3.7 | 55.8 |
| (4) | 58.2 | 4.3 | 62.5 |

(B) *Vegetables*

(1) Materials: One part of the composition of Example 3 was diluted with 6000 parts of water.
(2) Varieties: Cucumber, Kairyo Yaenari Ochiai Fushinari; pumpkin, Uchigi Akakawa; eggplant, Kawai Shinko Suzunari; tomato, Fl Seiko No. 1.
(3) Treatment: Pumpkin, tomato and eggplant were transplanted on April 17, and cucumber on April 24. After the transplanting the above mentioned solution was sprayed over the leaves once a week during nine weeks. Other cultivating methods were habitual.
(4) Results (per 10 plants):

| Items | Cucumber | Pumpkin | Eggplant | Tomato |
|---|---|---|---|---|
| Non-treated, kg | 22.3 (100%) | 46.2 (100%) | 106.9 (100%) | 15.6 (100%) |
| Treated, kg | 24.4 (109%) | 55.9 (120%) | 122.1 (114%) | 25.9 (166%) |

(C) *Potatoes*

(1) Materials: One part of the composition of Example 7 was diluted with 5000 parts of water.
(2) Varieties: Harusaku Chitose.
(3) Sowing: September 15.
(4) Treatment: The cut seed potatoes (each 25 grams) were soaked in the above mentioned solution for 24 hours, and then sowed.
(5) Standard of observation: The potatoes over 112 grams in weight is called "large potatoes."
(6) Results:

| Items | Gross weight of large potatoes per 10 are | | Gross weight of all potatoes per 10 are | |
|---|---|---|---|---|
| | Number of potatoes | Weight of potatoes, kg. | Number of potatoes | Weight of potatoes, kg. |
| Non-treated | 13,050 | 701.25 (100%) | 21,263 | 821.25 (100%) |
| Treated No. 1 | 18,450 | 937.50 (134%) | 24,750 | 1020.00 (124%) |
| Treated No. 2 | 17,100 | 915.00 (131%) | 26,100 | 1023.75 (124%) |
| Treated No. 3 | 21,150 | 1106.25 (158%) | 33,750 | 1275.00 (155%) |

(D) *Flowers*

(1) Materials: One part of the composition of Example 15 was diluted with 6000 parts of water.
(2) Varieties: Stock (Matsuda Aka).
(3) Sowing: August 26.
(4) Transplanting: September 30.
(5) Cutting pith: October 20.

(6) Treatment: The above mentioned solution was sprayed over leaves 3 times on October 10, 30 and January 10.

(7) Results: Average per 50 plants of each group.

| Items | Date | | | | | |
|---|---|---|---|---|---|---|
| | 24th of Nov. | | 10th of Jan. | | 27th of Feb. | |
| | Length of grass, cm. | Number of stalks | Length of grass, cm. | Number of stalks | Length of grass, cm. | Number of stalks |
| Non-treated | 11.98 | 4.91 | 38 | 5.1 | 76 | 20 |
| Treated | 12.14 | 5.25 | 41 | 6.7 | 79 | 30 |

*Discussion.*—The treatment by the above mentioned solution has caused good growth as well as rich formation of stalks and buds, and has promoted an earlier blooming on the plants.

What I claim is:

1. Method of accelerating the growth of plants which comprises applying to said plants a plant growth accelerating amount of a compound selected from the group consisting of nitroguaiacol and the water soluble salt of nitroguaiacol.

2. Method of accelerating the growth of plants which comprises applying to said plants a plant growth accelerating amount of a compound selected from the group consisting of nitroxylenol and the water soluble salt of nitroxylenol.

3. Method of accelerating the growth of plants which comprises immersing the seeds of said plants in a solution consisting essentially of a plant growth accelerating amount of a compound selected from the group consisting of nitroguaiacol and the water soluble salt of nitroguaiacol, and non-phytotoxic solvent.

4. Method of accelerating the growth of plants which comprises immersing the seeds of said plants in a solution consisting essentially of a plant growth accelerating amount of a compound selected from the group consisting of nitroxylenol and the water soluble salt of nitroxylenol, and non-phytotoxic solvent.

5. Method of accelerating the growth of plants which comprises spraying said plants with a plant growth accelerating amount of a compound selected from the group consisting of nitroguaiacol and the water soluble salt of nitroguaiacol wherein said compound is in admixture with a non-phytotoxic, finely divided dispersible solid.

6. Method of accelerating the growth of plants which comprises spraying said plants with a plant growth accelerating amount of a compound selected from the group consisting of nitroxylenol and the water soluble salt of nitroxylenol wherein said compound is in admixture with a non-phytotoxic, finely divided dispersible solid.

References Cited by the Examiner

UNITED STATES PATENTS 2,805,137  9/57  Clopton _____ 71—2.3 XR
3,082,076  3/63  Hemwall _____ 71—2.7

FOREIGN PATENTS 573,241  11/45  Great Britain.

OTHER REFERENCES

Jones et al.: Sci. Food Agri., vol. 5, 1954, pages 38–43.

King: Agricultural Handbook No. 69, May 1954, pages 4, 6, 262, 339.

LEWIS GOTTS, *Primary Examiner.*